United States Patent
Pérez Valencia et al.

(10) Patent No.: US 11,319,401 B1
(45) Date of Patent: May 3, 2022

(54) PROCESS FOR PREPARING POLYMER POLYOLS

(71) Applicant: REPSOL, S.A., Madrid (ES)

(72) Inventors: Juan Pedro Pérez Valencia, Madrid (ES); José Antonio Carazo Angulo, Madrid (ES)

(73) Assignee: REPSOL, S.A., Madrid (ES)

( * ) Notice: Subject to any disclaimer, the term of this patent is extended or adjusted under 35 U.S.C. 154(b) by 0 days.

(21) Appl. No.: 17/297,389

(22) PCT Filed: Feb. 24, 2021

(86) PCT No.: PCT/EP2021/054547
§ 371 (c)(1),
(2) Date: May 26, 2021

(87) PCT Pub. No.: WO2021/170648
PCT Pub. Date: Sep. 2, 2021

(30) Foreign Application Priority Data

Feb. 25, 2020 (EP) .................................... 20382130

(51) Int. Cl.
*C08G 18/63* (2006.01)
*C08G 18/81* (2006.01)
*C08K 5/134* (2006.01)

(52) U.S. Cl.
CPC ......... *C08G 18/636* (2013.01); *C08G 18/632* (2013.01); *C08G 18/8108* (2013.01); *C08K 5/134* (2013.01)

(58) Field of Classification Search
CPC .............................. C08G 18/636; C08F 283/06
See application file for complete search history.

(56) References Cited

U.S. PATENT DOCUMENTS

| | | | |
|---|---|---|---|
| 4,119,586 A | 10/1978 | Shah | |
| 4,208,314 A | 6/1980 | Priest et al. | |
| 4,454,255 A | 6/1984 | Ramlow et al. | |
| 4,458,038 A | 7/1984 | Ramlow et al. | |
| 4,460,715 A | 7/1984 | Hoffman et al. | |
| 4,550,194 A | 10/1985 | Reichel et al. | |
| 4,652,589 A | 3/1987 | Simroth et al. | |
| 5,093,412 A | 3/1992 | Ment et al. | |
| 5,814,699 A | 9/1998 | Kratz et al. | |

| | | | |
|---|---|---|---|
| 2016/0045426 A1* | 2/2016 | Nogueira | A61K 8/922 424/59 |
| 2018/0258211 A1* | 9/2018 | Ji | C08F 4/38 |
| 2021/0253907 A1* | 8/2021 | Attarwala | C08F 222/322 |

FOREIGN PATENT DOCUMENTS

| | | |
|---|---|---|
| CA | 2227346 A1 | 1/1998 |
| CN | 106589251 A * | 4/2017 |
| EP | 0193864 A1 | 9/1986 |
| EP | 0405608 A2 | 1/1991 |
| EP | 0640633 A1 | 3/1995 |
| EP | 2894180 A1 | 7/2015 |
| WO | 9715605 A1 | 5/1997 |
| WO | 9910407 A1 | 3/1999 |
| WO | 9940144 A1 | 8/1999 |
| WO | 2012154393 A3 | 11/2012 |
| WO | 2013158471 A1 | 10/2013 |
| WO | 2014137656 A1 | 9/2014 |
| WO | 2015165878 A1 | 11/2015 |

OTHER PUBLICATIONS

Google Translation of CN 106589251 (Year: 2022).*
Luperox 531M80 Safety Data Sheet (Year: 2017).*

* cited by examiner

*Primary Examiner* — Michael M Dollinger
(74) *Attorney, Agent, or Firm* — Hultquist, PLLC; Steven J. Hultquist

(57) ABSTRACT

The present invention refers to a method for the preparation of a polymer polyol which comprises:
(i) preparing an intermediate in a first reactor by polymerizing a mixture comprising:
(a) a base polyol in an amount from 60 to 100 wt % of the total amount of base polyol,
(b) at least one ethylenically unsaturated monomer,
(c) an acylperoxide radical initiator in an amount from 50 to 90 wt % of the total amount of acylperoxide radical initiator, and
(d) a preformed stabilizer in an amount from 70 to 100 wt % of the total amount of preformed stabilizer or a macromer in an amount of from 70 to 100 wt % of the total amount of macromer;
(ii) polymerizing in a second reactor a mixture comprising the intermediate prepared in step (i), the balance acylperoxide radical initiator proportion, the balance preformed stabilizer or macromer proportion and the balance base polyol proportion;
wherein the at least one ethylenically unsaturated monomer is added only to the first reactor.

20 Claims, No Drawings

PROCESS FOR PREPARING POLYMER POLYOLS

CROSS-REFERENCE TO RELATED APPLICATIONS

This is a U.S. national phase under 35 USC § 371 of International Paton Application PCT/EP2021/054547 filed Feb. 24, 2021, which in turn claims priority under 35 USC § 119 of European Patent Application No. EP20382130.1 filed Feb. 25, 2020. The disclosures of such applications are hereby incorporated herein by reference in their respective entireties, for all purposes.

FIELD OF THE INVENTION

The present invention relates to a process for preparing polymer polyols, particularly polymer polyols with high solids content.

BACKGROUND

Polymer polyols are high volume commercial products whose main use is the production of polyurethane foams. Polymer polyols contain dispersions of particles of a vinyl polymer in liquid base polyol formed from the in situ polymerization of selected compounds, such as acrylonitrile, styrene, methyl methacrylate and vinyl chloride. Commercially, the most important products are based on acrylonitrile and styrene.

The presence of the polymer particles in the polyol imparts various desirable properties to polyurethanes, particularly flexible polyurethane foams prepared from the polyol. In particular, the polymer particles act as a reinforcing filler and cell opener in the foam.

Polymer polyols are prepared by dispersion polymerization which first involves the production of radicals resulting from the thermal decomposition of a free-radical initiator, which in turn reacts with a vinylic monomer to form growing oligoradicals. Depending on its solubility in the medium, each oligoradical collapses into a condensed state when a certain threshold molecular weight is reached, giving rise to primary particles which attract either other primary particles or already existing larger ones.

Typically, azo compounds and peroxides are used as initiators. Reaction takes place at temperatures within the range 80 to 130° C., monomer being added to polyol at such a rate that its concentration remains low throughout the process. Chain transfer agents are generally used to control molecular weight and grafting of the base polyol (i.e. reaction of the initiator with the base polyol).

A problem generally found in the manufacture of polymer polyols is to obtain a polymer polyol having both a relatively high solid polymer content and a sufficiently low viscosity for ease of handling. A polymer polyol having this combination of properties is favourable for the properties of polyurethane foam produced from such polymer polyol.

High level of dispersed polymer particles (a concentrated polymer polyol) provides enhanced reinforcement and cell opening. In addition, the production of high level solids polymer polyols increases productivity since it is possible to get products containing smaller amounts just by diluting the concentrated product.

One problem with concentrated polymer polyol is that the dispersed polymer particles tend to agglomerate and then settle out of the continuous polyol phase invalidating its use. It is therefore desirable to prepare the concentrated polymer polyol in such a way that the tendency of the particles to agglomerate is minimized.

Another problem of concentrated polymer polyol dispersions is the exponential increase in viscosity with polymer particle content which usually hampers polymer particle concentration up to a viscosity limit, since pumping equipment used by foamers generally cannot handle high viscosities at an acceptable rate or with acceptable accuracy.

Furthermore, polymer polyols should not contain large particles (>3-5 µm) which may affect foam mechanical properties but neither small particles (<0.5 µm) that could be detrimental for viscosity.

In order to improve the stability of the polymer polyol dispersions and to avoid the problems mentioned above, stabilizers or dispersants are generally used. Stabilizer type (it can be formed by different molecules) and its concentration, may determine the particle size and particle size distribution which, in addition, affects product viscosity.

The most successful type of dispersant devised for use in dispersion polymerization has been based on a block or graft copolymer which consists of two essential polymeric components, one soluble and one insoluble in the continuous phase. The insoluble component, or anchor group, associates with the disperse phase polymer. It may become physically absorbed into the polymer particle, or can be designed so that it reacts chemically with the disperse phase after absorption.

The dispersant may be either preformed or formed in situ. In any of these cases, a precursor is usually employed. This precursor is also known as "macromonomer" or "macromer".

Macromers are polyether polyols (identical or different to the liquid base polyol) with terminal double bonds, able to copolymerize with vinylic monomers and to form graft species during the radical copolymerization. The polyol part typically contains long chains that are highly soluble in the continuous phase of the polymer polyol. The resulting block copolymer after reacting the macromer with vinylic monomers is in fact a non-aqueous dispersant which introduces polyol-soluble moieties onto the copolymer particles leading to improved particle stability.

Thus, polymer polyol processes are divided in two, depending on dispersant synthesis:

In situ formation simultaneously to polymer polyol synthesis process. In this process, macromer is added to the organic liquid serving as the polymerization medium (liquid base polyol). The monomer system being polymerized will react with the macromer during polymerization to form, in situ, a graft or addition copolymer dispersant. Thus, this process involves the simultaneous dispersion polymerization of monomers to produce polymer particles and block copolymer dispersant formation by grafting reaction of a macromonomer or macromer and monomers [CA2227346, WO99/40144, EP0405608, U.S. Pat. No. 5,093,412, WO99/10407, U.S. Pat. Nos. 4,652,589; 4,454,255; 4,458,038; 4,460,715; 4,119,586; 4,208,314].

Preformed stabilizer synthesis. In this case, the graft copolymer dispersant synthesis takes place apart from the main polymerization process, in a dedicated synthesis. Reaction procedure is similar to polymer polyol synthesis (it uses the same or similar reaction scheme, initiator, chain transfer agent, monomers . . . ) but employing different concentrations and similar or different reaction conditions (temperature, pressure, residence time, mixing regime . . . ), leading to a concentrated preformed stabilizer product which is added to polymer polyol reaction process [WO2015/165878, WO2014/137656, WO2012/154393, WO2013/158471, EP193864, U.S. Pat. No. 4,550,194 and WO97/15605].

Batch and continuous processes have been described for the manufacture of polymer polyols. The continuous processes are favored when the dispersant is pre-formed as a step prior to the reaction leading to the obtention of the polymeric polyol.

Despite the methods for preparing polymer polyols disclosed in the prior art, there is still room for improvement. In this regard, further effective methods for preparing polymer polyols are desirable, especially methods for preparing polymer polyols having high solids content while maintaining a suitable viscosity and good filterability.

Azo compounds such as AIBN and peroxides are typically used as initiators in the preparation of polymer polyols. However, AIBN and AMBN generate succinonitriles, which are toxic and difficult to strip from the final polymer polyol. Additionally, when the foams are made of polymer polyols containing an azo initiator, there may be an increase in the contribution of volatile emissions that may increase levels of VOC and FOG. Among organic peroxides, peroxyesters have been mainly used as free radical initiators for preparing polymer polyols. Acylperoxide radical initiators are generally less expensive, give lower grafting in base polyol and decomposition products are less harmful than peroxyesters, and so more convenient. However, they provide lower conversions. Therefore, further effective methods for preparing polymer polyols with high conversions using acylperoxides as radical initiators are desirable.

Document U.S. Pat. No. 5,814,699 refers to a continuous process for the preparation of polymer polyols with low viscosity and small average particle size. The process utilizes at least two reactors connected in series where at least part of the ethylenically unsaturated monomers and of the base polyol are added to the second reactor.

Document EP 0640633 A1 discloses a method for producing polymer polyols in a two reactor system, where the initiator and the ethylenically unsaturated monomers are fed to the first and second reactors and wherein less than 50 wt % of the ethylenically unsaturated monomers are fed to the first reactor.

BRIEF DESCRIPTION OF THE INVENTION

The authors of the present invention have found that very high conversions can be achieved using acylperoxide free-radical initiators in the preparation of polymer polyols by adding part of the acylperoxide initiator and optionally part of the pre-formed stabilizer (when a preformed stabilizer is used) or of the macromer (when the stabilizer is formed in situ) to a second reactor in a continuous multi-stage reaction preparation process. Polymer polyols having a high solids content while maintaining a viscosity suitable for handling can be obtained by the process of the invention.

Thus, the invention is directed to a process for the preparation of a polymer polyol comprising the following steps:
(i) preparing an intermediate in a first reactor by polymerizing a mixture comprising:
  (a) a base polyol in an amount from 60 to 100 wt % of the total amount of base polyol,
  (b) at least one ethylenically unsaturated monomer,
  (c) an acylperoxide radical initiator in an amount from 50 to 90 wt % of the total amount of acylperoxide radical initiator, and
  (d) a preformed stabilizer in an amount from 70 to 100 wt % of the total amount of preformed stabilizer or a macromer in an amount of from 70 to 100 wt % of the total amount of macromer;
(ii) polymerizing in a second reactor a mixture comprising the intermediate prepared in step (i), the balance acylperoxide radical initiator proportion, and the balance preformed stabilizer or macromer proportion and the balance base polyol proportion (if any).

In another aspect, the invention is directed to a polymer polyol obtained by the process of the invention.

In a further aspect, the invention relates to a process for the preparation of polyurethane foams from the polymer polyol obtained by the process of the invention and to the resultant polyurethane foams.

DETAILED DESCRIPTION OF THE INVENTION

Unless defined otherwise, all technical and scientific terms used herein have the same meaning as commonly understood to one of ordinary skill in the art to which this disclosure belongs. As used herein, the singular forms "a" "an" and "the" include plural reference unless the context clearly dictates otherwise.

The term "comprising" encompasses "including" as well as "consisting of" and "consisting essentially of".

As used herein, the term "wt %" means weight percent. All percentages used herein are by weight of the total composition, unless otherwise designated.

The term "polymer polyol", also referred to as dispersed polymer, refers to a composition (dispersion) produced by polymerizing one or more ethylenically unsaturated monomers dissolved or dispersed in a polyol (base polyol) in the presence of a free radical catalyst or initiator and a stabilizer to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

The balance proportion of a given component in step (ii) refers to the missing amount (if any) needed to reach the 100 wt % of the total amount of said component used in the process of the invention. Therefore, the balance proportion for each component can be calculated by extracting the percentage amount of said component added in step (i) to 100. Consequently, the mixture in step (ii) of the process of the invention comprises 10-50 wt % of the total amount of acylperoxide radical initiator, 0-30 wt % of the total amount of preformed stabilizer or macromer, and 0-40 wt % of the total amount of base polyol.

The process of the present invention is a continuous process in which a first intermediate is formed by reacting a mixture comprising a base polyol, at least one ethylenically unsaturated monomer, an acylperoxide radical initiator and either a preformed stabilizer or a macromer, wherein only part of the total amount of acylperoxide radical initiator used in the process is added to the reactor where this first intermediate is formed. The resulting intermediate is then transferred to a second reactor where it is further reacted with the remaining amount of acylperoxide radical initiator. Optionally, also part of the base polyol and/or of the preformed stabilizer or macromer can be added to the second reactor.

Other components, such as chain transfer agents and diluents or solvents, can be added to the first and/or second reactor.

In the process of the present invention, the at least one ethylenically unsaturated monomer is added only to the first reactor.

It has been found that higher conversions can be achieved when both the acylperoxide radical initiator and the pre-formed stabilizer or macromer are added to the first and second reactors. Therefore, in a preferred embodiment, only part of the total amount of acylperoxide radical initiator and of the preformed stabilizer or macromer used in the process is added to the first reactor, the remaining amount being added to the second reactor. Therefore, in a preferred embodiment, the process of the invention comprises the following steps:
(i) preparing an intermediate in a first reactor by polymerizing a mixture comprising:
   (a) a base polyol in an amount from 60 to 100 wt % of the total amount of base polyol,
   (b) at least one ethylenically unsaturated monomer,
   (c) an acylperoxide radical initiator in an amount from 50 to 90 wt % of the total amount of acylperoxide radical initiator, and
   (d) a preformed stabilizer in an amount from 70 to 98 wt % of the total amount of preformed stabilizer or a macromer in an amount from 70 to 98 wt % of the total amount of macromer;
(ii) polymerizing in a second reactor a mixture comprising the intermediate prepared in step (i), the balance acylperoxide radical initiator proportion, the balance preformed stabilizer or macromer proportion, and the balance base polyol proportion (if any).

In an embodiment, the stabilizer or dispersant used for the preparation of the polymer polyol is prepared in situ. That is, a macromer is added to the mixture in step (i) and optionally to the mixture in step (ii).

When a pre-formed stabilizer is used in the process of the invention, polymer polyols with higher solids content can be obtained. Thus, in a preferred embodiment, a pre-formed stabilizer or dispersant is used in the process for the preparation of the polymer polyol. That is, a stabilizer or dispersant is previously prepared and then added to the first reactor, and optionally to the second reactor, where the polymer polyol is produced. Therefore, in a preferred embodiment, the process of the invention comprises:
(i) preparing an intermediate in a first reactor by polymerizing a mixture comprising:
   (a) a base polyol in an amount from 60 to 100 wt % of the total amount of base polyol,
   (b) at least one ethylenically unsaturated monomer,
   (c) an acylperoxide radical initiator in an amount from 50 to 90 wt % of the total amount of acylperoxide radical initiator, and
   (d) a preformed stabilizer in an amount from 70 to 100 wt % of the total amount of preformed stabilizer;
(ii) polymerizing in a second reactor a mixture comprising the intermediate prepared in step (i), the balance acylperoxide radical initiator proportion, the balance preformed stabilizer (if any) and the balance base polyol proportion (if any).

In a further preferred embodiment, the process of the invention comprises:
(i) preparing an intermediate in a first reactor by polymerizing a mixture comprising:
   (a) a base polyol in an amount from 60 to 100 wt % of the total amount of base polyol,
   (b) at least one ethylenically unsaturated monomer,
   (c) an acylperoxide radical initiator in an amount from 50 to 90 wt % of the total amount of acylperoxide radical initiator, and
   (d) a preformed stabilizer in an amount from 70 to 95 wt % of the total amount of preformed stabilizer;
(ii) polymerizing in a second reactor a mixture comprising the intermediate prepared in step (i), the balance acylperoxide radical initiator proportion, the balance preformed stabilizer and the balance base polyol proportion (if any).

Base Polyol

The base polyol used in the process to prepare the polymer polyol may be any polyol known to be suitable as the liquid medium in polymer polyol systems. Accordingly, any polyol commercially available for polyurethane systems can in principle be used. The base polyol used may be the same as the polyol used for preparing the pre-formed stabilizer or the macromer, or may be a different polyol.

In an embodiment, the base polyol is a polyol having a hydroxyl functionality of at least 1, preferably at least 2, and more preferably more than or equal to 3. The functionality of the polyol is preferably less than or equal to 8, more preferably less than or equal to 6. In an embodiment, the base polyol is a polyol having a hydroxyl functionality from 2 to 8; preferably from 2 to 6; more preferably from 3 to 5.

In a particular embodiment, the base polyol has a molecular weight higher than 1.500 Da, preferably from 1.500 to 12.000 Da, more preferably from 2.000 to 6.000 Da.

Unless otherwise specified, the term "molecular weight" as used herein refers to the number average molecular weight. The number average molecular weight is determined by gel permeation chromatography.

In a further embodiment, the base polyol has a hydroxyl number in the range from 10 to 400, preferably from 15 to 150, more preferably from 15 to 100, even more preferably from 20 to 75. The hydroxyl number of a polyol can be measured according to the ASTM D4274 method. As used herein, the hydroxyl number is defined as the number of milligrams of potassium hydroxide required for the complete hydrolysis of the fully phthalylated derivative prepared from 1 gram of polyol.

$$OH=(56.1\times1000\times f)/\text{mol. wt.}$$

wherein:
OH: represents the hydroxyl number of the polyol,
f: represents the functionality of the polyol, i.e. the average number of hydroxyl groups per molecule of polyol, and
mol. wt. represents the molecular weight of the polyol.

In an embodiment, the base polyol is a polyol having a hydroxyl functionality from 2 to 6, a molecular weight from 1.500 to 12.000 Da, and a hydroxyl number from 15 to 150.

In an embodiment, the base polyol is selected from a polyether polyol, a polyester polyol and a polycarbonate polyol, that is, a polyol as defined above having ether groups, ester groups or carbonate groups, respectively, within the polymer chain.

In a preferred embodiment, the base polyol is a polyether polyol also usually referred to as polyalkylene polyether polyol. In a preferred embodiment, the polyether polyol is the product of polymerization of alkylene oxides having from 2 to 4 carbon atoms (e.g. ethylene oxide, propylene oxide, butylene oxide and mixtures thereof) in the presence of a starting compound having at least one active hydrogen atoms.

Suitable starting compounds for the obtention of polyether polyols include, for example, polyhydroxyl compounds such as, ethylene glycol, propylene glycol, diethylene glycol, dipropylene glycol, tripropylene glycol, trimethylolpropane, glycerol, sorbitol, glucose and sucrose; water; ammonia; amino alcohols such as ethanolamine, diethanolamine, triethanolamine; and primary and/or secondary amine or polyamines such as ethylenediamine, aniline and toluene diamine. By alkoxylation of the starter, a suitable polyether polyol can be formed. The alkoxylation reaction may be catalysed using any conventional catalyst including, for example, potassium hydroxide or a double metal cyanide (DMC) catalyst.

Examples of suitable polyether polyols include polyoxyethylene glycols, triols, tetrols and higher functionality polyols; polyoxypropylene glycols, triols, tetrols and higher functionality polyols; and mixtures thereof. When ethylene oxide and propylene oxide mixtures are used to produce the polyether polyol, the ethylene oxide and propylene oxide may be added simultaneously or sequentially so that the polyether polyol has internal blocks, terminal blocks or a random distribution of oxyethylene groups and/or oxypropylene groups.

Other polyols suitable for use as the base polyol of the present invention include: alkylene oxide adducts of 1,3-dihydroxypropane, 1,3-dihydroxybutane, 1,4-dihydroxybutane, 1,4-, 1,5-, 1,6-dihydroxyhexane, 1,2-, 1,3-, 1,4-, 1,6-, 1,8-dihydroxyoctant, 1,10-dihydroxydecane, glycerol, 1,2,4-trihydroxybutane, 1,2,6-trihydroxyhexane, 1,1,1-trimethyl-olethane, 1,1,1-trimethylol propane, pentaerythritol, caprolactone, polycaprolactone, xylitol, arabitol, sorbitol, mannitol and the like.

Other polyols which can be used as a base polyol include the alkylene oxide adducts of non-reducing sugars, wherein the alkylene oxides have from 2 to 4 carbon atoms. Non-reducing sugars and sugar derivatives include sucrose, alkyl glycosides such as ethylene glycol glycoside, propylene glycol glucoside, glycerol glucoside, and 1,2,6-hexanetriol glucoside, as well as alkylene oxide adducts of the alkyl glycosides.

Other suitable polyols include the polyphenols and preferably alkylene oxides adducts thereof in which the alkylene oxides have from 2 to 4 carbon atoms. Among the suitable polyphenols are bisphenol A, bisphenol F, condensation products of phenol and formaldehyde, the novolac resins, condensation products of various phenolic compounds and acrolein, including the 1,1,3-tris(hydroxyl-phenyl)propanes, condensation products of various phenolic compounds and glyoxal, glutaraldehyde, and other dialdehydes, including the 1,1,2,2-tetrakis(hydroxyphenol)ethanes.

In a preferred embodiment, the base polyol is a polyether polyol built up of propylene oxide and ethylene oxide units and preferably having a molecular weight from 2.000 to 6.000, and a hydroxyl functionality from 2 to 6, more preferably from 3 to 5. In an embodiment, the polyether polyol is a random or blocked propylene oxide-ethylene oxide copolymer with or without ethylene oxide terminal (cap) groups. In another embodiment, the polyether polyol is a propylene oxide polymer with ethylene oxide terminal groups.

In a preferred embodiment, the base polyol is a glycerol initiated polyether polyol built up of propylene oxide and ethylene oxide units and having a number average molecular weight from 2.000 to 6.000. Preferably, said base polyol comprises 5-30 wt % of ethylene oxide.

In a preferred embodiment, the base polyol is a propylene oxide adduct of glycerine containing of about 12 wt % random ethylene oxide with a hydroxyl number of about 55.

In another preferred embodiment, the base polyol is a propylene oxide adduct of glycerine containing an end-capping of about 19 wt % of ethylene oxide, and with hydroxyl number of about 35.

Suitable polyester polyols that can be used as base polyol include those obtained from the condensation of one or more polyhydric alcohols, especially di- or trihydric alcohols, having from 2 to 15 carbon atoms with one or more polycarboxylic acids, especially dicarboxylic acids, having from 2 to 14 carbon atoms. Examples of suitable polyhydric alcohols include 1,2-ethanediol, ethylene glycol, propylene glycol such as 1,2-ethanediol, diethylene glycol, 1,2-propylene glycol and 1,3-propylene glycol, glycerol, neopentyl glycol, pentaerythritol, trimethylolpropane, 1,4,6-octanetriol, 1,4-butanediol, 1,5-pentanediol, 1,6-hexanediol, dodecanediol, octanediol, chloropentanediol, glycerol monallyl ether, glycerol monoethyl ether, diethylene glycol, 2-ethylhexanediol, 1,4-cyclohexanediol, 1,1,1-trimethylolpropane, 1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, 3,3'-thiodipropionic acid, succinic acid, adipic acid, trimethyladipic acid, malonic acid, glutaric acid, pimelic acid, sebacic acid, suberic acid, azelaic acid, maleic acid, fumaric acid, trimellitic acid, dodecanedicarboxylic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Particularly suitable are polyester polyols obtained from the condensation of a diol having from 2 to 15 carbon atoms with a dicarboxylic acid having from 2 to 14 carbon atoms.

Suitable polycarbonate polyols that can be used as base polyol include those obtained by reacting one or more polyhydric alcohols, especially di- or trihydric alcohols, having from 2 to 15 carbon atoms with one or more dialkyl carbonates, diaryl carbonates or phosgene. Examples of suitable polyhydric alcohols include 1,2-ethanediol, ethylene glycol, propylene glycol such as 1,2-ethanediol, diethylene glycol, 1,2-propylene glycol and 1,3-propylene glycol, glycerol, neopentyl glycol, pentaerythritol, trimethylolpropane, 1,4,6-octanetriol, 1,4-butanediol, 1,5-pentanediol, 1,6-hexanediol, dodecanediol, octanediol, chloropentanediol, glycerol monallyl ether, glycerol monoethyl ether, diethylene glycol, 2-ethylhexanediol, 1,4-cyclohexanediol, 1,1,1-trimethylolpropane, 1,2,6-hexanetriol, 1,3,5-hexanetriol, 1,3-bis-(2-hydroxyethoxy)propane and the like. Examples of suitable dialkyl carbonates and diaryl carbonates include dialkyl carbonates, diaryl carbonates having from 2 to 14 carbon atoms, such as dimethyl carbonate, diethyl carbonate, di-n-butyl carbonate, diphenyl carbonate and the like. Particularly suitable are polycarbonate polyols obtained from the condensation of a diol having from 2 to 15 carbon atoms with a dialkyl carbonate or diaryl carbonates having from 2 to 14 carbon atoms, or with phosgene.

The particular base polyol used will depend on the end use of the polyurethane foam to be produced. A mixture of various useful polyols can be used, if desired.

The amount of base polyol in the mixture in the first reactor is 60-100 wt % of the total amount of base polyol used in the process. In a preferred embodiment, the amount of base polyol in the mixture in the first reactor is 70-100 wt % of the total amount of base polyol.

In a particular embodiment, when a preformed stabilizer is used in the process of the invention, the amount of base polyol in the mixture in the first reactor is preferably 90-100 wt %, more preferably 95-100 wt %, of the total amount of base polyol.

In a particular embodiment, the base polyol is used in the process of the invention in an amount from 20 to 80 wt %, preferably from 20 to 70 wt %, more preferably from 25 to 60 wt %, even more preferably from 25 to 55 wt % based on the total weight of the components used to prepare the polymer polyol (i.e. based on the total weight of the mixture in the first reactor+the mixture in the second reactor).

Ethylenically Unsaturated Monomer

The terms "ethylenically unsaturated monomer" or "vinylic monomer" as used herein refers to a monomer containing ethylenic unsaturation (>0=0<, i.e. two double bonded carbon atoms) that is capable to undergoing free radically induced addition polymerization reactions.

Suitable ethylenically unsaturated monomers for preparing the polymer polyol and the pre-formed stabilizer include: aliphatic conjugated dienes such as butadiene and isoprene; monovinylidene aromatic monomers such as styrene, α-methylstyrene, butylstyrene, chlorostyrene, cyanostyrene and bromostryrene; α,β-ethylenically unsaturated carboxylic acids and esters thereof such as acrylic acid, methacrylic acid, methyl acrylate, methyl methacrylate, ethyl acrylate, 2-hydroxypropyl acrylate, 2-hydroxyethyl acrylate, butyl acrylate, isopropyl methacrylate, maleic acid, fumaric acid, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl) acrylamide and the like; vinyl esters such as vinyl acetate; vinyl ethers, vinyl ketones, vinyl and vinylidene halides; as well as any other ethylenically unsaturated material that is capable to undergoing free radically induced addition polymerization reactions. Mixtures of two or more of the above-mentioned monomers may also be employed. Monovinylidene aromatic monomers and ethylenically unsaturated nitriles are particularly preferred, even more preferably styrene (SM) and acrylonitrile (ACN).

In a preferred embodiment, the at least one ethylenically unsaturated monomer is a mixture of ethylenically unsaturated monomers, preferably a mixture of two monomers. Most preferable it is a mixture of styrene and acrylonitrile.

In a particular embodiment, the at least one ethylenically unsaturated monomer used in the preparation of the polymer polyol is a mixture of styrene and acrylonitrile in a weight ratio of from 88:12 (SM:ACN) to 20:80 (SM:ACN); preferably from 88:12 to 40:60; more preferably from 80:20 to 50:50; even more preferably from 75:25 to 55:45.

In a particular embodiment, the at least one ethylenically unsaturated monomer used in the preparation of the pre-formed stabilizer is a mixture of styrene and acrylonitrile in a weight ratio of from 88:12 (SM:ACN) to 20:80 (SM:ACN); preferably from 80:20 to 30:70; more preferably from 70:30 to 40:60.

In an embodiment, the amount of the at least one ethylenically unsaturated monomer used in the preparation of the polymer polyol is between 20 and 70 wt % based on the total weight of the components used to prepare the polymer polyol. Preferably, however, between 30 and 65 wt %, more preferably between 40 to 60 wt % based on total weight of the components used to prepare the polymer polyol (i.e. based on the total weight of the mixture in the first reactor+the mixture in the second reactor).

In an embodiment, the amount of the at least one ethylenically unsaturated monomer used in the preparation of the preformed stabilizer is between 3 and 30 wt % based on the total weight of the components used to prepare the preformed stabilizer. Preferably, between 5 and 30 wt %, more preferably between 5 to 20 wt % based on total weight of the components used to prepare the preformed stabilizer.

In the process of the present invention, the at least one ethylenically unsaturated monomer is added only to the first reactor. That is, all the amount of the ethylenically unsaturated monomer(s) used in the process is fed to the first reactor.

Acylperoxide Radical Initiator

As used herein, the term acylperoxide radical initiator, also known as diacylperoxide radical initiator, refers to an organic compound having a diacyl functionality (—C(O)—O—O—C(O)—). In a particular embodiment, the acylperoxide radical initiator is a compound of formula

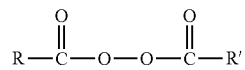

wherein R and R' are independently selected from linear or branched alkyl groups, preferably from a $C_1$-$C_{18}$ alkyl, more preferably $C_2$-$C_{18}$ alkyl, even more preferably $C_2$-$C_{12}$ alkyl.

The term akyl refers to a linear or branched hydrocarbon chain radical consisting of carbon and hydrogen atoms, containing no unsaturation, and which is attached to the rest of the molecule by a single bond. In an embodiment, the alkyl group has from 1 to 18 carbon atoms ("$C_1$-$C_{18}$ alkyl"), preferably 2 to 18 ("$C_2$-$C_{18}$ alkyl"), more preferably 2 to 12 ("$C_2$-$C_{12}$ alkyl") carbon atoms. In a particular embodiment, alkyl refers to i-propyl, 2,4,4-trimethylpentyl, n-decyl, n-undecyl or n-nonyl.

In a particular embodiment, the acylperoxide radical initiator is selected from di(3,5,5-trimethylhexanoyl) peroxide, didecanoyl peroxide, dilauroyl peroxide, diisobutyryl peroxide, preferably it is di(3,5,5-trimethylhexanoyl) peroxide.

The amount of acylperoxide radical initiator in the mixture in the first reactor is 50-90 wt % of the total amount of acylperoxide radical initiator used in the process. In a preferred embodiment, the amount of acylperoxide radical initiator in the mixture in the first reactor is 50-80 wt %, even more preferably from 55-75 wt %, of the total amount of acylperoxide radical initiator.

In a particular embodiment of the invention, the acylperoxide radical initiator is used in the process of the invention in an amount from 0.05 to 3 wt %, preferably from 0.1 to 2 wt %, more preferably from 0.3 to 1.5 wt % based on the total weight of the components used to prepare the polymer polyol (i.e. based on the total weight of the mixture in the first reactor+the mixture in the second reactor).

Macromer

The macromer can be used in the process of the invention either to prepare the preformed stabilizer or to generate the stabilizer in situ. In the latter case, the macromer is added to the first reactor and optionally to the second reactor.

Suitable macromers and processes for their preparation are well known in the art (e.g. U.S. Pat. No. 4,454,255). The term "macromer" or "macromonomer" refers to a molecule which comprises one or more polymerizable double bonds able to copolymerize with ethylenically unsaturated monomers such as styrene and acrylonitrile and which may comprise one or more hydroxyl-terminated polyether chains. Typical macromers include polyols, preferably polyether polyols, having an unsaturated group, which are commonly manufactured by reacting a polyol with an organic compound containing an unsaturated group and a carboxyl, anhydride, isocyanate, epoxy or other functional group able to react with active hydrogen-containing groups.

In a particular embodiment, the macromer is prepared by the reaction of a polyol, either directly or indirectly (e.g. by previous reaction of the polyol with a diisocyanate, such as TDI), with an unsaturated compound. More specifically, an unsaturated compound selected from maleic anhydride, fumaric acid, dialkyl fumarates, dialkyl maleates, glycol fumarates, glycol maleates, 1,1-dimethyl-m-isopropenylbenzyl isocyanate, isocyanato ethyl methacrylate, isocyanato ethyl ethylmethacrylate, isocyanato ethyl methylmethacrylate, 2-butene-1,4-diol, 1-butene-3,4-diol, hydroxymethyl methacrylate, hydroxypropyl acrylate, hydroxyethyl methacrylate, methyl methacrylate, acrylic acid, methacrylic acid, acrylic anhydride, methacrylic anhydride, methacroyl chloride, glycidyl methacrylate and allyl glycidyl ether. In a preferred embodiment, the macromer is the reaction product of a polyol with maleic anhydride (MA) or 1,1-dimethyl-m-isopropenylbenzyl isocyanate (TMI).

Optionally, the polyol used to prepare the macromer may be ontained by linkage of polyols through coupling with a compound such as a polyisocyanate (e.g. tolylene diisocyanate (TDI), diphenylmethane-4,4'-diisocyanate (MDI), hexamethylene disisocyanate (HMDI)) to produce a high molecular weight polyol, which is then reacted with the unsaturated compound.

In the preparation of the macromer, it is preferred that the quantity of the reactive unsaturated compound used is in the range of from 0.3 to 2.5 moles per mol of polyol, and preferably from 0.5 to 2.0 moles per mol of polyol.

In a preferred embodiment, the reactive unsaturated compound used is maleic anhydride. In another preferred embodiment, the reactive unsaturated compound used is 1,1-dimethyl-m-isopropenylbenzyl isocyanate.

The polyol used for preparing the macromer may be selected from a polyether polyol, a polyester polyol or a polycarbonate polyol. Suitable polyether polyols, polyester polyols and polycarbonate polyols are as defined herein in relation to the base polyol.

In a preferred embodiment, it is a polyether polyol. More preferably, it is selected from a polyoxyalkylene polyether polyol as defined above in relation to the base polyol.

In a preferred embodiment, the polyol used for preparing the macromer is a polyether polyol obtained by polymerization of alkylene oxides having from 2 to 4 carbon atoms (e.g. ethylene oxide, propylene oxide, butylene oxide and mixtures thereof) in the presence of a starting compound having at least one active hydrogen atom, preferably 2-6 active hydrogen atoms.

In a preferred embodiment, the polyol is a polyether polyol built up of propylene oxide and ethylene oxide units and preferably having a molecular weight from 1500 to 12000, and a hydroxyl functionality from 2 to 6, more preferably from 3 to 6. In an embodiment, the polyether polyol is a random or blocked propylene oxide-ethylene oxide copolymer with or without ethylene oxide terminal (cap) groups. In another embodiment, the polyether polyol is a propylene oxide polymer with ethylene oxide terminal groups.

In a preferred embodiment, the polyol is a glycerol or sorbitol initiated polyether polyol built up of propylene oxide and ethylene oxide units and having a hydroxyl number from 20 to 45. Preferably, said base polyol comprises 5-30 wt %, more preferably 10-20 wt %, of ethylene oxide.

In a preferred embodiment, the base polyol used for preparing the macromer is a propylene oxide adduct of sorbitol containing about 16 wt % ethylene oxide cap with hydroxyl number of about 29.

In another preferred embodiment, the polyol used for preparing the macromer is a propylene oxide adduct of glycerine containing of about 13 wt % ethylene oxide cap with hydroxyl number of about 35.

Stabilizer

In the present document, the terms "dispersant" and "stabilizer" are used indistinctly. Dispersants or stabilizers are typically employed in the preparation of polymer polyols to stabilize the dispersion of polymers resulting from polymerization of the ethylenically unsaturated monomers in the polyol phase.

In an embodiment, the stabilizer or dispersant is generated "in situ" adding a macromer to the reaction mixture for preparing the polymer polyol.

When the stabilizer is generated in situ, the macromer is added to the mixture in the first reactor and optionally to the mixture in the second reactor.

In a particular embodiment, when the stabilizer is generated in situ, the macromer in the process for preparing the polymer polyol is used in a total amount (i.e. mixture in the first reactor+mixture in the second reactor) from 1 to 20 wt %, preferably from 1 to 10 wt %, more preferably from 2 to 6 wt % based on total weight of the components used to prepare the polymer polyol (i.e. based on the total weight of mixture in the first reactor+mixture in the second reactor).

When the stabilizer is generated in situ, the amount of macromer in the mixture in the first reactor is 70-100 wt % of the total amount of macromer used in the process. In an embodiment, the amount of macromer in the mixture in the first reactor is 75-100 wt % of the total amount of macromer. In another embodiment, the amount of macromer in the mixture in the first reactor is preferably 70-98 wt %, more preferably 70-95 wt % of the total amount of macromer.

In a preferred embodiment of the present invention, a pre-formed stabilizer or dispersant is used. That is, a stabilizer or dispersant is previously formed and then added to the first reactor and optionally to the second reactor where the polymer polyol is prepared.

Pre-formed stabilizers and processes for their preparation are well known in the art. The term pre-formed stabilizer is defined as an intermediate obtained by reacting a macromer with at least one ethylenically unsaturated monomer (e.g. acrylonitrile, styrene, methylmethacrylate, etc.), optionally with a chain transfer agent and optionally in a diluent (e.g. methanol, isopropanol, toluene, ethylbenzene, polyether polyols, etc.) to give a copolymer (dispersion having low solids content, e.g. <20 wt %, such as from 3 to 15 wt %). The resulting dispersant allows the stabilization of the solid particles of the polymer polyol. Suitable preformed stabilizers include those known in the art.

Suitable macromers for the preparation of the pre-formed stabilizer are as defined herein.

In a particular embodiment, the macromer used in the preparation of the pre-formed stabilizer is in an amount from 10 to 60 wt %, preferably from 15 to 50 wt %, more preferably from 15 to 40 wt % based on the total weight of the components used to prepare the pre-formed stabilizer (i.e. 100% by weight of the combined weight of the macromer, the ethylenically unsaturated monomer(s), the free-radical polymerization initiator and the optional diluent and/or the optional chain transfer agent).

Suitable ethylenically unsaturated monomers for preparing the pre-formed stabilizer are as defined above in relation to the preparation of the polymer polyol. In a particular embodiment, the at least one ethylenically unsaturated monomer for preparing the preformed stabilizer is a mixture of at least two ehtylenically unsaturated monomers as defined herein, preferably a mixture of styrene and acrylonitrile. These monomers are typically used in weight ratios of from 88:12 (SM:ACN) to 20:80 (SM:ACN). In a particular embodiment, the weight ratio of SM:ACN is from 80:20 to 40:60; preferably from 70:30 to 40:60; even more preferably from 70:30 to 45:55.

In an embodiment, the amount of the at least one ethylenically unsaturated monomer for the preparation of the pre-formed stabilizer may vary between 3 and 30 wt % based on the total weight of the components used to prepare the pre-formed stabilizer; preferably between 5 and 25 wt %, more preferably between 5 to 20 wt % based on total weight of the components used to prepare the pre-formed stabilizer.

Initiation of the polymerization to prepare the preformed stabilizer can be accomplished using conventional free-radical initiators which are known in the art. Suitable free-radical initiators for the preformed stabilizer include peroxides including both alkyl and aryl hydroperoxides, acyl peroxides, peroxyesters, persulfates, perborates, percarbonates and azo compounds. Some specific examples include hydrogen peroxide, dibenzoyl peroxide, didecanoyl peroxide, dilauroyl peroxide, t-butyl hydroperoxide, benzoyl peroxide, di-t-butyl peroxide, di(3,5,5-trimethylhexanoyl)peroxide, diisobutyryl peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-butyl peroxy-2-ethyl hexanoate, tert-amyl peroxy-2-ethylhexanoate, (1,1,3,3-tetramethylbutyl peroxy-2-ethylhexanoate), cumene hydroperoxide, azobis(isobutyronitrile) and 2,2'-azo bis-(2-methylbutyronitrile).

Among the useful initiators, preferably are those having a satisfactory half-life within the temperature ranges used in the polymerization reaction, i.e., the half-life should be about 25% or less of the residence time in the reactor at any given time. Preferred initiators include acyl peroxides such as didecanoyl peroxide, lauroyl peroxide, diisobutyryl peroxide and di(3,5,5-trimethylhexanoyl)peroxide, peroxyesters such as tert-amyl peroxy-2-ethylhexanoate, 1,1,3,3-tetramethylbutyl peroxy-2-ethylhexanoate, and azo compounds such as azobis(isobutyronitrile) and 2,2'-azo bis-(2-methylbutyronitrile).

In a particular embodiment, the free-radical initiator used to prepare the preformed stabilizer is in an amount from 0.01 to 2 wt %, preferably from 0.05 to 1 wt %, more preferably from 0.1 to 1 wt %, based on the total weight of reactants used in the preparation of the pre-formed stabilizer (macromer, ethylenically unsaturated monomer(s), free-radical polymerization initiator and optional chain transfer agent and/or diluent).

Suitable diluents for the preparation of the pre-formed stabilizer include, for example, compounds such as mono-ols (i.e., monohydroxy alcohols), polyols, hydrocarbons, ethers etc., and mixtures thereof. Suitable mono-ols include all alcohols which contain at least one carbon atom, preferably from 1 to 4 carbon atoms ($C_{1-4}$) such as, for example, methanol, ethanol, n-propanol, isopropanol, n-butanol, sec.-butanol, tert-butanol, n-pentanol, 2-pentanol, 3-pentanol, etc. and mixtures thereof. A preferred mono-ol is isopropanol.

In a preferred embodiment, the pre-formed stabilizer is prepared in a diluent; preferably in isopropanol.

In a particular embodiment, the diluent used for the preparation of the preformed stabilizer is in an amount from 10 to 85 wt %, preferably from 20 to 75 wt %, more preferably from 40 to 70 wt %, based on the total weight of reactants used in the preparation of the pre-formed stabilizer (macromer, ethylenically unsaturated monomer(s), free-radical polymerization initiator and optional chain transfer agent and/or diluent).

Chain transfer agents may also be used in the preparation of the pre-formed stabilizer. The use of chain transfer agents and their nature is known in the art. They are also commonly referred to as polymer control agents or molecular weight regulators since they are employed to control the molecular weight of the copolymerizate. Suitable chain transfer agents include mercaptans (e.g. dodecanethiol, ethanethiol, 1-heptanethiol, 2-octanethiol and toluenethiol), alkyl halides (carbon tetrachloride, carbon tetrabromide, chloroform, methylene chloride), alcohols (e.g. isopropanol, ethanol, tert-butanol, methanol), toluene, ethylbenzene, trimethylamine, water, cyclohexane, terpinolene.

In a preferred embodiment, a mono-alcohol is used as both the diluent and transfer agent, more preferably isopropanol. The mono-alcohol, preferably isopropanol, can be used in an amount, for example, from 10 to 85 wt %, preferably from 20 to 75 wt %, more preferably from 40 to 70 wt %, based on the total weight of reactants used in the preparation of the pre-formed stabilizer.

In a particular embodiment, the temperature in which the reaction for preparing the pre-formed stabilizer takes place should be selected to allow the thermal decomposition of the free-radical initiator leading to free-radicals that enable initiating the polymerization of the ethylenically unsaturated monomer(s). In a particular embodiment, this polymerization is carried out at a temperature of at least 100° C., preferably from 100 to 140° C., more preferably from 110° C. to 130° C.

In a particular embodiment of the invention, the pressure in the process for preparing the pre-formed stabilizer is at least 3.5 bar, preferably from 4 to 6 bar, more preferably from 4 to 5 bar.

In a particular embodiment of the invention, the residence time in the process for preparing the pre-formed stabilizer is at least 20 minutes, preferably from 25 to 90 minutes, more preferably from 30 to 80 minutes.

The pre-formed stabilizer used in the process for preparing the polymer polyol of the present invention is a mixture comprising the preformed stabilizer optionally dispersed in the diluent and/or chain transfer agent together with any unreacted monomer.

In a particular embodiment of the invention, the pre-formed stabilizer used in the preparation of the polymer polyol is used in a total amount (i.e. mixture in the first reactor+mixture in the second reactor) from 5 to 25 wt %, preferably from 5 to 20 wt %, more preferably from 5 to 15 wt % based on total weight of the components used to prepare the polymer polyol (i.e. based on the total weight of mixture in the first reactor+mixture in the second reactor).

When a preformed stabilizer is used, the amount of preformed stabilizer in the mixture in the first reactor is 70-100 wt % of the total amount of preformed stabilizer used in the process. In an embodiment, the amount of preformed stabilizer in the mixture in the first reactor is 80-100 wt % of the total amount of preformed stabilizer. In another embodiment, the amount of preformed stabilizer in the mixture in the first reactor is preferably 70-95 wt %, more preferably 80-95 wt %, of the total amount of preformed stabilizer.

Chain Transfer Agent

In a particular embodiment, the process of the invention for preparing a polymer polyol comprises the addition of a chain transfer agent to the first and/or to the second reactors.

In a particular embodiment, when a preformed stabilizer is used in the process of the invention, no chain transfer agent is added to the reactors (other than the chain transfer agent coming from the preformed stabilizer).

In a particular embodiment, when a preformed stabilizer is used, no chain transfer agent is added to the first reactor and a chain transfer agent is optionally added to the second reactor.

In another embodiment, when a macromer is used in the process of the invention (i.e. the stabilizer is formed in situ), a chain transfer agent is added to the first reactor and optionally to the second reactor, preferably terpinolene or isopropanol. In an embodiment, it is added only to the first reactor. In a further embodiment, when a macromer is used, a chain transfer agent is added to the first reactor and to the second reactor.

In a particular embodiment, when a macromer is used in the process of the invention, 0-50% of the total amount of chain transfer agent used in the process is added to the second reactor; preferably from 0-30%. In another embodiment, when a macromer is used in the process of the invention, 5-50% of the total amount of chain transfer agent used in the process is added to the second reactor; preferably from 5-30%.

Chain transfer agents are known in the art. Suitable chain transfer agents include, for example, mercaptans (e.g. dodecanethiol, ethanethiol, 1-heptanethiol, 2-octanethiol and toluenethiol), alkyl halides (carbon tetrachloride, carbon tetrabromide, chloroform, methylene chloride), alcohols (e.g. isopropanol, ethanol, tert-butanol, methanol), toluene, ethylbenzene, trimethylamine, water, cyclohexane, terpinolene.

In a particular embodiment, the chain transfer agent used in the process for preparing the polymer polyol is in a total amount (i.e. mixture in the first reactor+mixture in the second reactor) from 0.1 to 10 wt %, preferably from 0.2 to 8 wt % % based on total weight of the components used to prepare the polymer polyol (i.e. based on the total weight of the mixture in the first reactor+mixture in the second reactor).

Process for Preparing the Polymer Polyol

In a particular embodiment, the temperature in which the reaction takes place should be selected to allow the thermal decomposition of the acylperoxide radical initiator, so as the O—O bonds are broken leading to free-radicals that enable initiating the polymerization of the ethylenically unsaturated monomer(s).

In a particular embodiment, the process of the invention can be carried out in each of the reactors at a temperature independently selected from at least 100° C., preferably from 100 to 140° C., more preferably from 110° C. to 130° C. In a more preferred embodiment, the process of the invention is carried out in each of the reactors at a temperature from 115° C. to 130° C.

In a particular embodiment of the invention, the residence time in each of the first and second reactors is independently selected from at least 20 minutes, preferably from 25 to 90 minutes, more preferably from 30 to 75 minutes.

In an embodiment, the process of the invention can be carried out in each of the reactors at a pressure independently selected from 3 bar, preferably from 3 to 6 bar, more preferably from 4 to 6 bar.

In an embodiment, the first and second reactors are stirred-tank reactors connected in series.

Reference to the mixture in the first reactor and the mixture in the second reactor in the process of the invention includes both separate introduction of each of the reagents, or of some of them, into the reactor, and prior combination of all or of some of the reagents into a single stream for their combined introduction into the reactor.

Preferably, the two-stage reactor consists of a first stage, continuous stirred tank reactor where feed streams are introduced. The reactor can be operated liquid full, and the temperature controlled. The outlet from the first stage is fed to a second stage, continuous stirred tank reactor. Reaction pressure, can be regulated by a back pressure regulator, in the second stage outlet line.

After step ii), the volatile components (e.g. residual monomers and free radical initiator secondary decomposition products) can be removed by vacuum flash and stripping. Such stripping can be suitably carried out by heating to a temperature in the range of from 100 to 150° C. with stirring and application of vacuum and/or of steam or nitrogen stripping.

The resultant polymer polyols obtainable by the process of the invention exhibit a good combination of properties, in particular an adequate particle size, particle size distribution, high solids content while low viscosity, making them very suitable for its processability in the synthesis of polyurethane foams.

Polymer polyols with high solids content can be obtained by using the process of the invention, particularly polymer polyols with high solids content while maintaining reasonable viscosities. In a particular embodiment, the process of the invention leads to a polymer polyol with a solid content from 40 to 65 wt % based on the total weight of the resultant polymer polyol. Preferably, the solids content of the polymer polyols ranges from 45 to 65 wt %, more preferably from 50 to 65 wt %, based on the total weight of the polymer polyol. In a particular embodiment, when a preformed stabilizer is used in the process of the invention, a polymer polyol with a solids content from 50 to 65 wt % based on the total weight of the polymer polyol is preferably obtained; more preferably from 50 to 62 wt %, based on the total weight of the polymer polyol. In another embodiment, when the stabilizer is formed in situ in the process of the invention, a polymer polyol with a solids content from 45 to 65 wt % based on the total weight of the polymer polyol is preferably obtained; more preferably from 45 to 55 wt %, even more preferably from 45 to 50 wt %, based on the total weight of the polymer polyol.

The resulting polymer polyols can be diluted to the desired solids content value.

The polymer polyols obtained according to the process of the present invention present good viscosity vs. solids content value.

Preferably, the polymer polyols obtained by the process of the invention exhibit an average particle size of more than 0.5 µm, preferably between 0.5 µm and 2 µm.

The polymer polyols prepared by the process of the present invention are particularly useful for the production of polyurethanes, preferably polyurethane foams, which are prepared by reacting the resulting polymer polyol with isocyanates in the presence of polyurethane catalysts, a foaming agent and a cross-linking agent, in accordance with techniques and processes widely known to those skilled in the art.

Therefore, in an embodiment, the process of the invention further comprises a step of preparing a polyurethane foam with the resulting polymer polyol, e.g. by reacting the resulting polymer polyol with an isocianate in the presence of a polyurethane catalyst, a foaming agent and a cross-linking agent.

In a further aspect, the invention relates to a process for the preparation of polyurethane foams from the polymer polyol obtained by the process of the invention and to the resultant polyurethane foams.

Styrene polymer content of the polymer polyol was determined by means of H-NMR (Bruker AV500, USA), in deuterated acetone.

Acrylonitrile polymer content of the polymer polyol was determined by means of Nitrogen Kjeldhal analysis.

Solids content of the polymer polyol is calculated by adding styrene and acrylonitrile polymer content values (not including stabilizer and unreacted ethylenically unsaturated monomers).

Dynamic viscosity is determined following EN ISO 3219 guidelines, employing a Haake iQ viscotester using the spindle CC25DIN/Ti. Viscosity determination according to this standard is performed at 25° C. and 25 s-1.

Particle size is determined by static laser diffraction using a Mastersizer 3000 equipment dispersing the sample in ethanol and calculating the particle size distribution using Fraunhofer theory.

EXAMPLES

The invention is illustrated by means of the following examples, which in no case limit the scope of the invention.

Polyol A is a propylene oxide adduct of glycerine containing of about 12 wt % random ethylene oxide with a hydroxyl number of about 55 and a 464 mPa·s viscosity, commercially available under the name Alcupol® F-5511 from Repsol Química.

Polyol B is a propylene oxide adduct of glycerine containing of about 19 wt % ethylene oxide cap with hydroxyl number of about 35 and a 835 mPa·s viscosity, commercially available under the name Alcupol® F-3541 from Repsol Química.

Macromer A: a propylene oxide adduct of sorbitol containing 16 wt % ethylene oxide cap with hydroxyl number of 29 (polyol). This macromer is prepared by reacting, under heating at 90° C., the polyol with 1.2 moles of Isopropenyl dimethyl benzyl isocyanate (sold as TMI® (META) by Allnex) per mole of polyol in the presence of 300 ppmw of tin(II) 2-ethylhexanoate as catalyst for 3 hours under nitrogen atmosphere, resulting in a molecule containing polymerizable carbon-carbon double bonds.

Macromer B: it was prepared by heating a propylene oxide adduct of glycerine containing 13 wt % ethylene oxide cap with hydroxyl number of 35 (polyol) with 1.6 parts by weight of maleic anhydride per part of polyol and 0.01 parts by weight of calcium (II) 2-ethylhexanoate catalyst per part of polyol at 145° C. for about 1 hour in a nitrogen atmosphere obtaining and intermediate product. This intermediate product was subsequently reacted with 0.06 parts by weight of propylene oxide per part of polyol at 145° C. for 4 hours. Volatiles were stripped off at 110° C. under vacuum using nitrogen as stripping gas, resulting in a molecule containing 0.75 polymerizable carbon-carbon double bonds per mole of polyol.

Initiator A: di(3,5,5-trimethylhexanoyl)peroxide, a free-radical polymerization initiator commercially available as Trigonox36 from Nouryon.

Initiator B: 1,1,3,3-tetramethylbutyl peroxy-2-ethyl-hexanoate a free-radical polymerization initiator commercially available as Trigonox421 from Nouryon.

Initiator C: tert-amyl peroxy-2-ethylhexanoate a free-radical polymerization initiator commercially available as Trigonox121 from Nouryon.

Initiator D: 2,2'-Azodi(2-methylbutyronitrile), a free-radical polymerization initiator commercially available as Perkadox AMBN from Nouryon.

Initiator E: Dilauroyl peroxide, a free-radical polymerization initiator commercially available as Laurox from Nouryon.

CTA A: Terpinolene, a chain transfer agent.
CTA B: 2-propanol, a chain transfer agent.
SM: Styrene Monomer
ACN: Acrylonitrile Monomer.

General Polymer Polyol Synthesis Process:

The polymer polyols were prepared in two 300 cc reactors connected in series, provided with stirrers and with temperature, flow and pressure control (backpressure control valve at the outlet of the second reactor). The second reactor was connected to the first one in series. A pre-mixed solution of reactants was pumped continuously into the first reactor in series. A second pre-mixed solution of reactants (initiator, solvent, macromer, preformed stabilizer . . . ) can also be pumped at a controlled rate using a syringe pump with cooled container into the second reactor together with the first reactor product, according to the test. Reaction pressure was regulated at 3 barg. Once stationary state was reached, reaction output product was continuously collected in a stirred tank with a thermal jacket for heating and connection to a vacuum system, to perform flash+stripping of the final product of the reaction, in order to remove volatiles.

Reaction conversion, X (%), was calculated as follows:

$$X(\%) = \frac{\text{Solids}(wt\%) \times (100 - \text{Initiator}(wt\%) - \text{CTA}(wt\%) - \text{SM}(wt\%) - \text{ACN}(wt\%))}{\left(1 - \frac{\text{Solids}(wt\%)}{100}\right) \times (\text{SM}(wt\%) + \text{ACN}(wt\%))}$$

where:
Solids (wt %), represents the solids content obtained in the stripped product expressed in weight percentage.
Initiator (wt %), CTA (wt %), SM (wt %) and ACN (wt %), represents the initiator, chain transfer agent and/or solvent, styrene monomer and acrylonitrile monomer contents fed to the process (first and second reactor feeds), expressed in weight percentages.

A. In Situ Preparation of the Stabilizer/Dispersant

Comparative Examples 1-9. Preparation of Polymer Polyols with In Situ Preparation of the Stabilizer. Two Reactors Connected in Series and Reagents Fed Only to the First Reactor Following general polymer polyol synthesis process described above, with feeding of all components only to the first reactor in series, several examples were performed using different initiator types (azo, peroxyester and diacyl peroxides free-radical initiators). Employed formulations and conditions, as well as properties of the polymer polyols obtained in each example, are shown in Table 1.

TABLE 1

| | Comp. 1 | Comp. 2 | Comp. 3 | Comp. 4 | Comp. 5 | Comp. 6 | Comp. 7 | Comp. 8 | Comp. 9 |
|---|---|---|---|---|---|---|---|---|---|
| Base polyol | B | B | B | B | A | A | A | A | A |
| Macromer | B | B | B | B | B | B | B | B | B |
| CTA | A | A | A | A | A | A | A | A | A |
| Initiator | D | E | A | A | B | D | A | A | A |
| Initiator Type | Azo | Diacylperoxide | Diacylperoxide | Diacylperoxide | Peroxyester | Azo | Diacylperoxide | Diacylperoxide | Diacylperoxide |
| First Reactor Feed (% wt) | | | | | | | | | |
| Base Polyol | 59.75 | 59.51 | 52.7 | 52.7 | 47.35 | 47.4 | 47.19 | 46.81 | 46.9 |
| Macromer | 4 | 4 | 4.7 | 4.7 | 3.4 | 3.4 | 3.4 | 3.7 | 3.46 |
| SM | 23.4 | 23.4 | 27.4 | 27.4 | 32 | 32 | 32 | 32 | 32 |
| ACN | 11.7 | 11.7 | 13.7 | 13.7 | 16 | 16 | 16 | 16 | 16 |
| CTA | 0.8 | 0.8 | 0.8 | 0.8 | 0.85 | 0.85 | 0.7 | 0.61 | 0.61 |
| Initiator | 0.35 | 0.59 | 0.7 | 0.7 | 0.4 | 0.35 | 0.71 | 0.85 | 1 |
| Second Reactor Feed (% wt) | | | | | | | | | |
| Base Polyol | — | — | — | — | — | — | — | — | — |
| Macromer | — | — | — | — | — | — | — | — | — |
| CTA | — | — | — | — | — | — | — | — | — |
| Initiator | — | — | — | — | — | — | — | — | — |
| Reaction Conditions | | | | | | | | | |
| Residence Time per Reactor (min) | 35 | 35 | 35 | 35 | 35 | 35 | 43 | 35 | 35 |
| Temperature (° C.) | 125 | 125 | 125 | 120 | 125 | 125 | 120 | 140 | 120 |
| Polymer Polyol Results | | | | | | | | | |
| Solids (% wt) | 34.3 | 30.6 | 36.2 | 36.4 | 46.7 | 47.5 | 43 | 44.4 | 44.2 |
| Viscosity (cp) | 3700 | 2961 | 5080 | 4506 | 7418 | 6264 | 3931 | 5584 | 4685 |
| X (%) | 95.7 | 79.8 | 78.9 | 79.6 | 92.6 | 95.8 | 78.9 | 83.6 | 81.4 |

As shown in Table 1, lower conversions (X) were obtained for diacyl peroxide initiators compared to azo and peroxyester type initiators, even when working at higher initiator concentration, temperature and residence time.

Example 1: Preparation of Polymer Polyols with In Situ Preparation of the Stabilizer. Two Reactors Connected in Series. Initiator Fed to First and Second Reactor General polymer polyol synthesis process described above was followed with feeding of the initiator to first and second reactors in series and using a diacyl peroxide initiator. Employed formulations and conditions, as well as properties of the polymer polyol obtained in this example are shown in Table 2.

First reactor and second reactor feed compositions are calculated as a percentage of total feed to first plus second reactor. Considering the values given in the table, initiator distribution was 64% to first reactor and 36% of total initiator to second reactor.

TABLE 2

| Example | Ex. 1 |
|---|---|
| Base polyol | A |
| Macromer | B |
| CTA | A |
| Initiator | A |
| Initiator Type | diacylperoxide |
| First Reactor Feed (% wt) | |

TABLE 2-continued

| Example | Ex. 1 |
|---|---|
| Base Polyol | 46 |
| Macromer | 4.48 |
| SM | 31.88 |
| ACN | 15.94 |
| CTA | 0.6 |
| Initiator | 0.7 |
| Second Reactor Feed (% wt) | |
| Base Polyol | — |
| Macromer | — |
| CTA | — |
| Initiator | 0.39 |
| Reaction Conditions | |
| Residence Time per Reactor (min) | 31 |
| Temperature (° C.) | 125 |
| Polymer Polyol Results | |
| Solids (% wt) | 45.8 |
| Viscosity (cp) | 6124 |
| X (%) | 89.3 |

As can be observed, this example resulted in a polymer polyol with higher conversion than comparative examples with diacylperoxide initiator fed only to the first reactor.

Examples 2-3: Preparation of Polymer Polyols with In Situ Preparation of the Stabilizer According to the Invention. Two Reactors Connected in Series with Initiator and Macromer Fed to the First and Second Reactors General polymer polyol synthesis process described above was followed with feeding of the initiator and macromer to first and second reactors in series and using a diacyl peroxide initiator. A premixture of initiator and macromer diluted in base polyol or solvent (used also as chain transfer agent) was used to feed the second reactor. Employed formulations and conditions, as well as properties of the polymer polyol obtained in this example are shown in Table 3.

First reactor and second reactor feed compositions are calculated as a percentage of total feed to first plus second reactor. Considering the values given in the table, initiator distribution was 61 to 69% to first reactor and 39 to 31% of total initiator to second reactor. Macromer distribution was 80 to 95% to first reactor and 20 to 5% of total amount to second reactor.

This process allowed preparing polymer polyols with very high solids content. Additionally, the obtained polymer polyols showed good viscosity vs. solids content, stability and particle size.

Example 2 is similar to example 1 but with addition of part of the macromer to the second reactor. This resulted in a polymer polyol with high solids content and low viscosity, similar to those obtained in comparative examples 5-9, but with very high monomer conversion in the reaction process (similar to azo initiators—comparative example 6—and peroxyester initiators—comparative example 5).

Example 3 is similar to example 2, using isopropanol as chain transfer agent instead of terpinolene and changing initiator and macromer feed distribution between the first and second reactors.

TABLE 3

| Example | Ex. 2 | Ex. 3 |
|---|---|---|
| Base polyol | A | A |
| Macromer | B | B |
| CTA | A | B |
| Initiator | A | A |
| Initiator Type | diacylperoxide | diacylperoxide |
| First Reactor Feed (% wt) | | |
| Base Polyol | 34.31 | 37.12 |
| Macromer | 3.12 | 3.65 |
| SM | 32.07 | 33.05 |
| ACN | 16.03 | 18.36 |
| CTA | 0.57 | 6.12 |
| Initiator | 0.62 | 0.41 |
| Second Reactor Feed (% wt) | | |
| Base Polyol | 12.08 | — |
| Macromer | 0.8 | 0.19 |
| CTA | — | 0.91 |
| Initiator | 0.4 | 0.18 |
| Reaction Conditions | | |
| Residence Time per Reactor (min) | 43 | 60 |
| Temperature (° C.) | 117 | 120 |
| Polymer Polyol Results | | |
| Solids (% wt) | 48.5 | 55 |
| Viscosity (cp) | 6364 | 22140 |
| X (%) | 94.6 | 97.8 |

The above results show that the process of the invention leads to a high improvement in the reaction conversion compared to a conventional process with diacyl peroxide radical initiators where all the reagents are fed to the first reactor. As shown in Table 3, this improvement is higher when both the initiator and the macromer are partly added to the second reactor.

Comparative Example 10. Preparation of Polymer Polyols with In Situ Preparation of the Stabilizer. Two Reactors Connected in Series with Initiator and Ethylenically Unsaturated Monomers (Styrene and Acrylonitrile) Fed to the First and Second Reactors In this example, the general polymer polyol synthesis process described above was followed, but with feeding of initiator and ethylenically unsaturated monomers (styrene and acrylonitrile) to the first and second reactors in series and using a diacylperoxide free-radical initiator. Employed reagents and conditions, as well as properties of the polymer polyol obtained are shown in Table 4.

For comparative purposes, Example 1, but without feeding of the ethylenically unsaturated monomers to the second reactor, is also shown in Table 4.

TABLE 4

| Example | Ex. 1 | Comparative Ex. 10 |
|---|---|---|
| Base polyol | A | A |
| Macromer | B | B |
| CTA | A | A |
| Initiator | A | A |
| Initiator Type | diacylperoxide | diacylperoxide |
| First Reactor Feed (% wt) | | |
| Base Polyol | 46 | 46.0 |
| Macromer | 4.48 | 4.5 |
| SM | 31.88 | 14.3 |
| ACN | 15.94 | 7.2 |
| CTA | 0.6 | 0.6 |
| Initiator | 0.7 | 0.7 |
| Second Reactor Feed (% wt) | | |
| SM | — | 17.5 |
| ACN | — | 8.8 |
| Initiator | 0.39 | 0.38 |
| Reaction Conditions | | |
| Residence Time per Reactor (min) | 31 | 42/31 |
| Temperature (° C.) | 125 | 125 |
| Polymer Polyol Results | | |
| Solids (% wt) | 45.8 | 45.7 |
| Viscosity (cp) | 6124 | 10200 |
| X (%) | 89.3 | 88.9 |

The percentage amount of initiator and of ethylenically unsaturated monomers fed to each reactor are shown in Table 5 below.

TABLE 5

| | Ex 1 | | Comparative Ex. 10 | |
|---|---|---|---|---|
| | Initiator | Monomers (SM and ACN) | Initiator | Monomers (SM and ACN) |
| 1$^{st}$ reactor | 64% | 100% | 65% | 45% |
| 2$^{nd}$ reactor | 36% | 0% | 35% | 55% |

Comparative Example 10 corresponds to a process as disclosed in EP 0640633 A1, where both the initiator and the ethylenically unsaturated monomers are fed to the first and second reactors and wherein less than 50 wt % of the ethylenically unsaturated monomers are fed to the first reactor.

The inventors found that when a diacylperoxide was used as initiator in said process, a product containing lumps was formed. That is, a non-stable product was obtained in Comparative Example 10. This is also related with the higher viscosity obtained in this example (very high ratio of viscosity vs solids content). Although the viscosity of a polymer polyol is known to exponentially increase with the solids content, the product obtained in Comparative Example 10 has a much higher viscosity than the product in Example 1 at a similar solids content.

Therefore, diacylperoxide initiators were found not suitable for the process disclosed in EP 0640633 A1, since a non-stable, higher viscous product was obtained (lumps were formed).

In contrast, in the process according to the invention (Example 1) no lump formation was observed, and a stable and less viscous product was obtained. Indeed, stable products with a good viscosity vs. solids content value ratio were obtained in all the examples according to the invention.

B. Preformed Stabilizer/Dispersant

The preformed stabilizers were prepared in a 300 cc reactor provided with stirrer and with temperature, flow and pressure control (backpressure control valve at the outlet). A pre-mixed solution of reactants was pumped continuously into the reactor. Reaction pressure was regulated at 3 barg. Reaction temperature was controlled at 120° C. The residence time in the reactor was about 60 minutes. Once stationary state was reached, reaction output product was collected in a stirred tank with an internal coil for refrigeration. Compositions used are shown in Table 6.

TABLE 6

|  | A | B |
|---|---|---|
| PFS | A | B |
| Macromer | A | A |
| Initiator | A | C |
| Feed (% wt) | | |
| 2-propanol | 63.4 | 61.78 |
| Macromer | 27 | 24 |
| SM | 5.6 | 7 |
| ACN | 3.5 | 7 |
| Initiator | 0.5 | 0.22 |

Comparative Example 11-18: Preparation of Polymer Polyols with Preformed Stabilizer. Two Reactors Connected in Series and Reagents Fed Only to the First Reactor Following general polymer polyol synthesis process described above, with feeding of all components only to first reactor in series, several examples were performed using different initiators types (azo, peroxyester and diacyl peroxides free-radical initiators). Employed formulations and conditions, as well as properties of the polymer polyols obtained in each example, are shown in Table 7.

TABLE 7

| | Example | | | | | | | |
|---|---|---|---|---|---|---|---|---|
| | Comp. 11 | Comp. 12 | Comp. 13 | Comp. 14 | Comp. 15 | Comp. 16 | Comp. 17 | Comp. 18 |
| Base polyol | A | A | A | A | A | A | A | A |
| PFS | B | B | B | A | B | A | A | B |
| CTA | — | A | — | — | — | — | — | — |
| Initiator | C | C | D | A | A | A | A | A |
| Initiator Type | Peroxyester | | Azo | | diacylperoxide | | | |
| First Reactor Feed (% wt) | | | | | | | | |
| Base Polyol | 33.95 | 33.35 | 42.71 | 42.94 | 33.58 | 33.98 | 34.11 | 33.58 |
| PFS | 9.9 | 9.9 | 9.9 | 9.5 | 9.9 | 9.5 | 9.5 | 9.9 |
| SM | 36 | 36 | 30.24 | 30.24 | 36 | 36 | 36 | 36 |
| ACN | 20 | 20 | 16.8 | 16.8 | 20 | 20 | 20 | 20 |
| CTA | — | 0.6 | — | — | — | — | — | — |
| Initiator | 0.15 | 0.15 | 0.35 | 0.52 | 0.52 | 0.52 | 0.39 | 0.52 |
| Second Reactor Feed (% wt) | | | | | | | | |
| Base Polyol | — | — | — | — | — | — | — | — |
| PFS | — | — | — | — | — | — | — | — |
| CTA | — | — | — | — | — | — | — | — |
| Initiator | — | — | — | — | — | — | — | — |
| Reaction Conditions | | | | | | | | |
| Residence Time per Reactor (min) | 47 | 47 | 47 | 47 | 47 | 61 | 61 | 61 |
| Temperature (° C.) | 120 | 120 | 120 | 120 | 120 | 120 | 120 | 120 |
| Polymer Polyol Results | | | | | | | | |
| Solids (% wt) | plugging | 57.2 | 51.1 | 47.7 | 57.1 | 58.6 | 58.3 | 58 |
| Viscosity (cp) | | 46440 | 6861 | 4895 | 11980 | 16790 | 17050 | 16570 |
| X (%) | | 83.5 | 97.5 | 86.8 | 83.7 | 91.2 | 90.4 | 86.8 |

Comparative example 11 uses a peroxyester initiator and no chain transfer agent other than 2-propanol product entering the process within the preformed stabilizer feed. When performing this experiment high product viscosity and internal reactor fouling were experienced, leading to reactor plugging.

Comparative example 12 was performed as comparative example 11 just adding terpinolene as chain transfer agent, obtaining a high viscosity product.

Comparative example 13 uses an azo initiator and no other chain transfer agent different from 2-propanol product within the preformed stabilizer feed, in the same way as in comparative example 11. A high solid content low viscosity polymer polyol was obtained with a 97.5% conversion rate.

Comparative examples 14 to 18 were performed in a similar way to comparative examples 11 and 13, but using a diacylperoxide initiator. All of them performed well giving rise to a high solid content low viscosity polymer polyol (much better than peroxy initiator comparative example 12 and similar to the product obtained with an azo initiator in comparative example 13). However, even after increasing residence time, lower conversions were observed for the diacyl peroxide initiator compared to the azo type initiators.

Examples 4-6. Preparation of Polymer Polyols with Preformed Stabilizer According to the Invention. Two Reactors Connected in Series with Initiator and Preformed Stabilizer Feed to the First and Second Reactors General polymer polyol synthesis process described above was followed, with feeding of the diacyl peroxide initiator and the preformed stabilizer to first and second reactors in series. Employed formulations and conditions, as well as properties of the polymer polyol obtained in this example are shown in Table 8.

TABLE 8

| Example | Ex 4 | Ex 5 | Ex 6 |
|---|---|---|---|
| Base polyol | A | A | B |
| PFS | B | B | B |
| CTA | — | — | — |
| Initiator | A | A | A |
| Initiator Type | diacylperoxide | | |
| First Reactor Feed (% wt) | | | |
| Base Polyol | 33.7 | 37.5 | 41.9 |
| PFS | 9.8 | 9.8 | 9.8 |
| SM | 35.4 | 32.9 | 30.0 |
| ACN | 19.6 | 18.3 | 16.7 |
| CTA | — | — | — |
| Initiator | 0.41 | 0.41 | 0.41 |
| Second Reactor Feed (% wt) | | | |
| Base Polyol | — | — | — |
| PFS | 0.89 | 0.91 | 0.91 |
| CTA | — | — | — |
| Initiator | 0.18 | 0.18 | 0.18 |
| Reaction Conditions | | | |
| Residence Time per Reactor (min) | 50 | 60 | 60 |
| Temperature (° C.) | 120 | 120 | 120 |
| Polymer Polyol Results | | | |
| Solids (% wt) | 60.7 | 55.8 | 51.4 |
| Viscosity (cp) | 19790 | 10450 | 12550 |
| X (%) | 97.1 | 96.6 | 97.9 |

Example 4 is similar to comparative example 15 but dividing the initiator feed between first and second reactor, where 70% of total initiator was fed to first reactor. Preformed stabilizer (PFS) feed was also divided, feeding 92% of total PFS to first reactor. A high solid content low viscosity polymer polyol was obtained, also achieving a higher monomer conversion rate than comparative example 15 where all the components were fed to the first reactor (conversion similar to that obtained with azo initiators).

Example 5 is similar to comparative example 18 but dividing the initiator feed between first and second reactor, where 69% of total initiator was fed to first reactor. Preformed stabilizer feed was also divided, feeding 92% of total PFS to first reactor. A high solid content low viscosity polymer polyol was obtained, also achieving a higher monomer conversion rate than comparative example 18 where all the components were fed to the first reactor (conversion similar to that obtained using azo initiators).

Example 6 is similar to example 5 changing base polyether polyol and slightly lowering monomer content. A high solid content low viscosity polymer polyol is obtained, also achieving a high monomer conversion rate.

The above results show that the process of the invention leads to a high improvement in the reaction conversion compared to a conventional process with diacyl peroxide radical initiators where all the reagents are fed to a first reactor.

This process allowed preparing polymer polyols with very high solids content. Additionally, the obtained polymer polyols show good viscosity, stability and particle size.

The invention claimed is:

1. A process for the preparation of a polymer polyol comprising the following steps:
   (i) preparing an intermediate in a first reactor by polymerizing a mixture comprising:
      (a) a base polyol in an amount from 60 to 100 wt % of the total amount of base polyol,
      (b) at least one ethylenically unsaturated monomer,
      (c) an acylperoxide radical initiator in an amount from 50 to 90 wt % of the total amount of acylperoxide radical initiator, and
      (d) a preformed stabilizer in an amount from 70 to 100 wt % of the total amount of preformed stabilizer or a macromer in an amount of from 70 to 100 wt % of the total amount of macromer;
   (ii) polymerizing in a second reactor a mixture comprising the intermediate prepared in step (i), the balance acylperoxide radical initiator proportion, the balance preformed stabilizer or macromer proportion and the balance base polyol proportion;
   wherein the at least one ethylenically unsaturated monomer is added only to the first reactor.

2. Process according to claim 1, wherein the mixture in step (i) comprises a preformed stabilizer in an amount from 70 to 98 wt % of the total amount of preformed stabilizer or a macromer in an amount of from 70 to 98 wt % of the total amount of macromer.

3. Process according to claim 1, wherein the acylperoxide radical initiator is a compound of formula

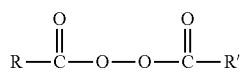

wherein R and R' are independently selected from linear or branched $C_1$-$C_{18}$ alkyl.

4. Process according to claim 1, wherein the wt % of total acylperoxide radical initiator is from 0.05 to 3 wt %, based on the sum of the total weight of the mixture in the first reactor and the mixture in the second reactor.

5. Process according to claim 1, wherein the at least one ethylenically unsaturated monomer is a mixture of styrene and acrylonitrile.

6. Process according to claim 1, wherein the wt % of the at least one ethylenically unsaturated monomer is between 20 and 70 wt %, based on the sum of the total weight of the mixture in the first reactor and the mixture in the second reactor.

7. Process according to claim 1, wherein the base polyol is a polyether polyol.

8. Process according to claim 1, wherein the base polyol is a polyether polyol built up of propylene oxide and ethylene oxide units and with a hydroxyl functionality from 2 to 6.

9. Process according to claim 1, wherein the wt % of base polyol is from 20 to 80 wt % based on the sum of the total weight of the mixture in the first reactor and the mixture in the second reactor.

10. Process according to claim 1, wherein a chain transfer agent is added to the mixture in the first reactor and/or to the mixture in the second reactor.

11. Process according to claim 1, wherein the macromer is a polymer obtained by reaction of a polyether polyol with an unsaturated isocyanate or anhydride.

12. Process according to claim 1, wherein the preformed stabilizer is a polymer obtained by reaction of a macromer and a mixture of at least two ethylenically unsaturated monomers in the presence of a free radical initiator and optionally a diluent and/or a chain transfer agent.

13. Process according to claim 1, wherein:
the wt % of total preformed stabilizer is from 5 to 25 wt %, based on the sum of the total weight of the mixture in the first reactor and the mixture in the second reactor, or
the wt % of total macromer is from 1 to 20 wt %, based on the sum of the total weight of the mixture in the first reactor and the mixture in the second reactor.

14. Process according to claim 1, wherein steps (i) and (ii) are carried out at a temperature between 100 and 140° C.

15. Process according to claim 1, wherein the residence time in each of the first and second reactors is at least 20 minutes.

16. Process according to claim 3, wherein R and R' are independently selected from linear or branched $C_2$-$C_{12}$ alkyl.

17. Process according to claim 5, wherein the at least one ethylenically unsaturated monomer is a mixture of styrene and acrylonitrile in a weight ratio of from 88:12 (SM:ACN) to 20:80 (SM:ACN).

18. Process according to claim 6, wherein the wt % of the at least one ethylenically unsaturated monomer is between 30 and 65 wt % based on the sum of the total weight of the mixture in the first reactor and the mixture in the second reactor.

19. Process according to claim 12, wherein the diluent and/or a chain transfer agent is a $C_{1-4}$ mono-alcohol.

20. Process according to claim 13, wherein:
the wt % of total preformed stabilizer is from 5 to 20 wt % based on the sum of the total weight of the mixture in the first reactor and the mixture in the second reactor, or
the wt % of total macromer is from 1 to 10 wt % based on the sum of the total weight of the mixture in the first reactor and the mixture in the second reactor.

* * * * *

UNITED STATES PATENT AND TRADEMARK OFFICE
CERTIFICATE OF CORRECTION

PATENT NO. : 11,319,401 B1
APPLICATION NO. : 17/297389
DATED : May 3, 2022
INVENTOR(S) : Juan Pedro Perez Valencia It is certified that error appears in the above-identified patent and that said Letters Patent is hereby corrected as shown below:

In the Specification

Column 9, Line 16, ">O=O<" should be -- >C=C< --.

Signed and Sealed this
Thirtieth Day of August, 2022

Katherine Kelly Vidal
*Director of the United States Patent and Trademark Office*